United States Patent [19]
Cunningham

[11] 3,737,556
[45] June 5, 1973

[54] CABLE TERMINATION APPARATUS WITH RIGID STRESS RELIEF ASSEMBLY AND CONDUCTIVE SEAL

[75] Inventor: Francis V. Cunningham, Western Springs, Ill.

[73] Assignee: Joslyn Mfg. and Supply Co., Chicago, Ill.

[22] Filed: Jan. 21, 1972

[21] Appl. No.: 219,800

[52] U.S. Cl. .................................. 174/19, 174/73 R
[51] Int. Cl. ............................................ H02g 15/22
[58] Field of Search ...................... 174/11 BH, 12 BH, 174/19, 20, 73 R, 73 SC, 75 D, 75 F, 80, 142

[56] References Cited

UNITED STATES PATENTS

| | | | |
|---|---|---|---|
| 2,967,901 | 1/1961 | Priaroggia | 174/73 R |
| 3,290,428 | 12/1966 | Yonkers | 174/73 R |
| 3,317,654 | 5/1967 | Yonkers | 174/73 R |
| 3,673,305 | 6/1972 | Mashikian et al. | 174/73 R X |

FOREIGN PATENTS OR APPLICATIONS

| | | | |
|---|---|---|---|
| 1,400,928 | 4/1965 | France | 174/73 R |
| 1,408,279 | 7/1965 | France | 174/73 R |
| 877,055 | 9/1961 | Great Britain | 174/73 R |

*Primary Examiner*—Laramie E. Askin
*Attorney*—Richard D. Mason, Andrew J. Bootz and Robert L. Rohrback et al.

[57] ABSTRACT

A termination or splice apparatus for use with insulated power cable comprising a rigid housing having an elongated bore for receiving a terminal end portion of the cable, and a conducting elastomeric sealing means at one end of the bore. An integral stress relief assembly includes a preformed cone of rigid conducting material and an insulating section, and is seated in the bore adjacent said sealing means and extends toward the opposite end for a distance substantially less than the total length of the bore. The remaining portion of the bore is filled with dielectric insulating fluid and a load-bearing insulation system that exerts compression through said stress cone and insulating section against said sealing means to provide continuously sealing engagement at said one end of the bore around the cable through a wide range of temperature variations.

22 Claims, 2 Drawing Figures

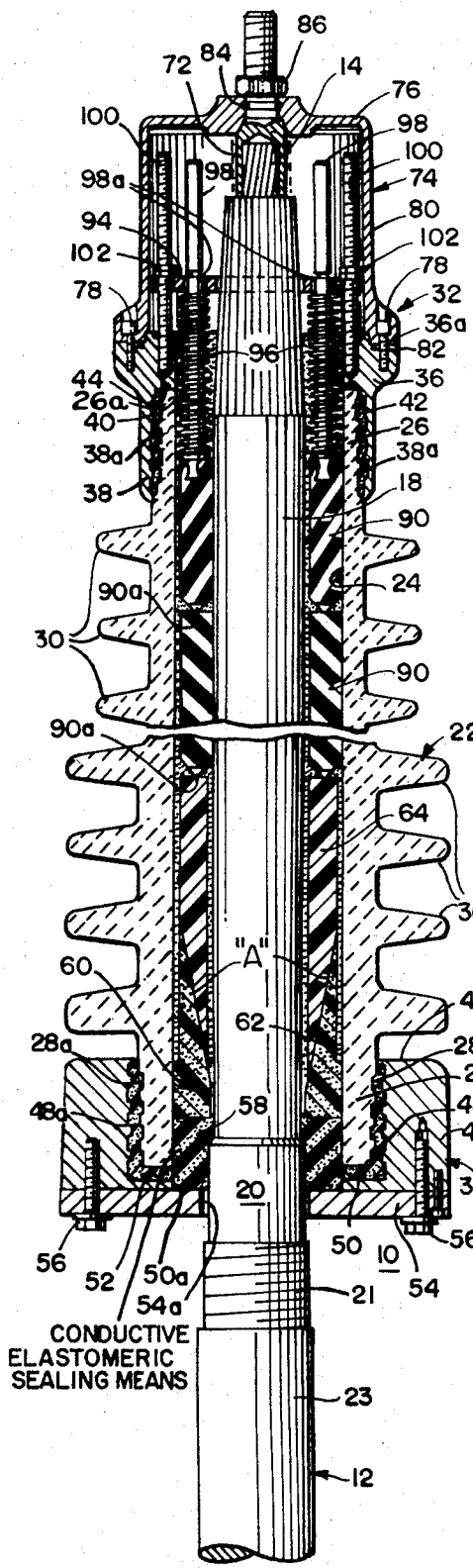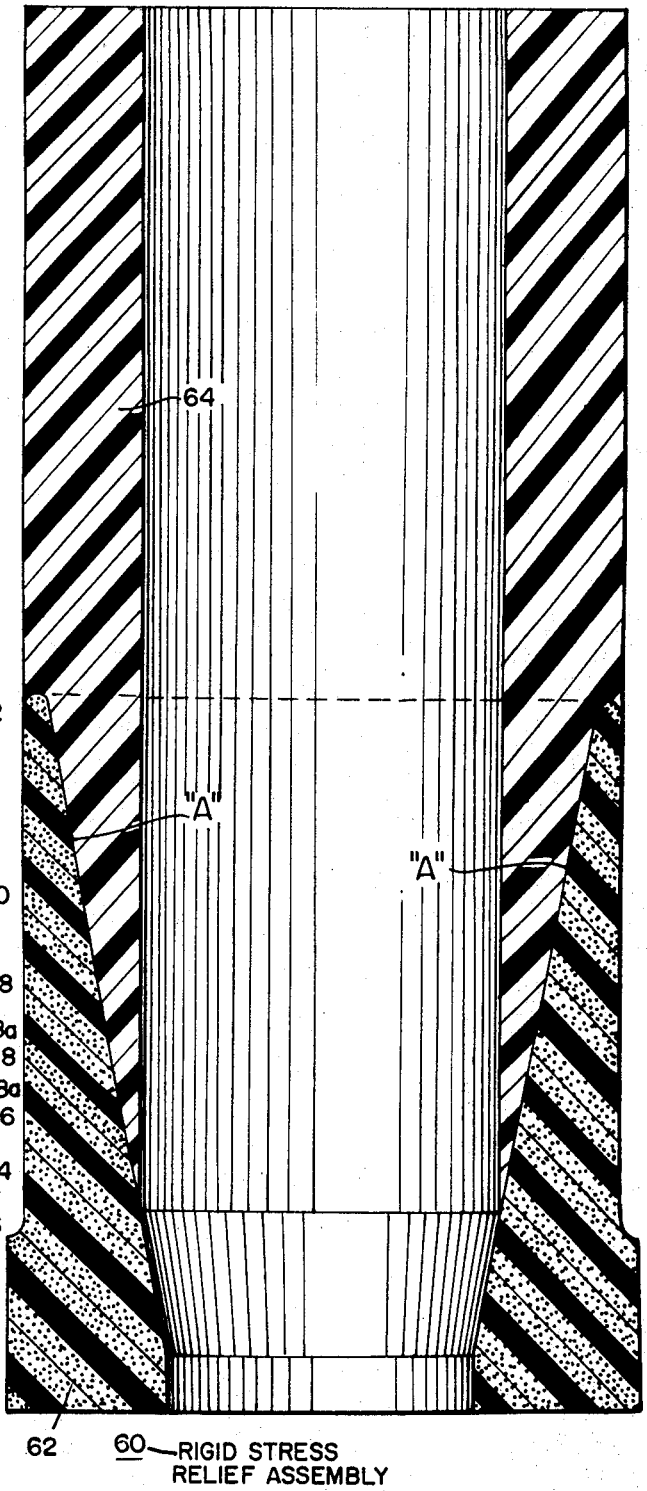

CABLE TERMINATION APPARATUS WITH RIGID STRESS RELIEF ASSEMBLY AND CONDUCTIVE SEAL

The present invention relates to a new and improved electrical termination or splice apparatus, and more particularly to a termination or splice apparatus suitable for use with high voltage insulated power cable.

As herein used, termination refers to the terminating of the insulation system of a cable by the application of stress relief, and includes, if a joint or splice, the means by which the insulation of one cable is continued with the insulation of another. Thus the present apparatus is suitable for terminating a single cable or joining a pair of cables to form a splice.

It is an object of the present invention to provide a new and improved high voltage, termination apparatus for insulated power cable which does not require the use of an elastic filler to provide a stress cone for the cable.

It is another object of the present invention to provide a new and improved termination apparatus of the character described using a relatively short, conductive, elastomeric sealer to seal around the cable at the entrance to the housing and a stress cone of relatively rigid material which exerts compression to maintain a tight seal.

It is another object of the present invention to provide a new and improved electrical termination apparatus for use with high voltage power cable, which apparatus can be installed by relatively unskilled workmen with excellent results.

Another object of the present invention is the provision of a new and improved stress relief assembly including a rigid preformed stress cone.

Another object of the invention is to provide a high voltage termination apparatus wherein the stress relief assembly transmits compression against a short, elastomeric sealing means to maintain sealing engagement at the entrance end of the housing bore around the cable regardless of temperature variation.

Still another object of the present invention is to provide a new and improved electrical cable termination of the character described employing an insulating dielectric fluid, a thrust bearing insulation, a deformable seal, and compressive force, in a manner ensuring that air within the dielectric portion of the terminal is eliminated.

The foregoing and other objects and advantages of the present invention are accomplished in one illustrated embodiment thereof comprising a terminal apparatus for high voltage, insulated power cable. The apparatus includes a hollow, rigid housing having an elongated axial bore for receiving a terminal end portion of the cable. An annular, relatively short, conductive, elastomeric seal or sealing ring is provided in the entrance end of the housing around the cable forming a fluid-tight seal and a tubular sleeve is provided adjacent the seal ring. The seal is capable of being continuously deformed in any direction without rupture. The sleeve is formed of relatively rigid material and includes a stress relief cone formed of conductive material and an insulating section which is substantially lesser in length than the length of insulation required for the specific voltage being used. One or more load-bearing insulating members and a dielectric insulating fluid are used in the remaining length of the housing bore to furnish the needed length of insulation, and compression means exerts force through the sleeve and insulating members for maintaining the elastomeric seal ring in a tight end sealing condition around the cable and the cable entrance end of the housing bore.

For a better understanding of the present invention, reference should be had to the following detailed description and claims taken in conjunction with the drawing, in which:

FIG. 1 is a longitudinal sectional view of a new and improved high voltage cable termination apparatus characterized by the features of the present invention; and FIG. 2 is an enlarged, longitudinal, sectional view of the stress cone and insulating sleeve of the cable termination apparatus.

Referring now more particularly to the drawings, therein is illustrated one embodiment of a new and improved cable termination apparatus 10 constructed in accordance with the features of the present invention and being especially adapted for use in terminating high voltage, insulated, power cables such as a cable 12 which includes a central conductor 14 formed of a plurality of spirally wound, individual wires and including a concentric insulation 18. The insulation 18 is generally extruded in place on the central conductor and is covered by a conductive outer shield 20 generally maintained at ground potential so that the dielectric stress gradient in the insulation 18 between the shield 20 and the central conductor 14 is relatively uniform throughout the length of the cable. The outer shield 20 is covered by a wound, thin copper tape 21 which is terminated short of the terminal housing and the tape is covered by a tough, protective, outer insulating jacket 23.

The termination apparatus 10 is relatively long (for example, in a 138 Kilovolt application the overall length of the illustrated apparatus approaches eight feet) and includes an elongated, hollow, terminal housing having a body 22 constructed of strong, rigid material, such as wet process porcelain having a glazed outer surface. The termination body includes a generally cylindrical, uniform diameter, axial bore 24 extending longitudinally thereof between an upper end terminal support portion 26 and a lower end terminal support portion 28. The outer surface of the housing body between the upper and lower terminal end support portions is formed with a plurality of integral, radially outwardly extending, longitudinally spaced annular rings or ridges 30 which provide increased creepage distance between the end terminals.

An upper terminal assembly 32 and a lower terminal assembly 34 are mounted adjacent the upper and lower ends, respectively, on the housing body and the upper terminal includes a terminal ring 36 which is fixedly mounted on the upper end terminal portion 26 of the housing body. The upper, fixed, terminal ring 36 includes a generally cylindrical depending lower sidewall 38 and an open upper end 40 approximately equal in diameter to the cylindrical bore 24. In order to permanently secure the terminal ring 36 onto the upper end of the housing body, the inside surface of the terminal sidewall 38 is formed with a plurality of alternate ridges and grooves 38a, and the facing opposite surface of the upper terminal housing end portion 26 is provided with a plurality of similar outwardly facing alternate ridges and grooves 26a. The space between these facing sets of ridges and grooves 26a and 38a is filled with a strong, weather-proof, electrically conducting cementitious material 42, such as a conductive epoxy resin. When the material 42 cures or hardens, the upper terminal ring 36 is permanently affixed on the body 22 and an airtight seal between the upper end of the housing body and the terminal ring 36 is ensured by means of an O-ring 44 seated in an annular groove provided in the terminal ring.

The lower terminal assembly 34 includes a fixed upper ring member 46 permanently mounted on the lower terminal end portion 28 of the body 22, and the ring member includes an upwardly extending, generally cylindrical skirt or sidewall 48 and an integral, radially inwardly extending, lower end wall or flange 50 having a central aperture 50a substantially equal in diameter to the diameter of the cylindrical bore 24. The outer surface of the lower end portion 28 of the body is formed with a plurality of alternate ridges and grooves 28a, and the oppositely facing, confronting inner surface of the terminal ring skirt 48 is similarly formed with a plurality of alternate grooves and ridges 48a. The space between the facing sets of grooves and ridges is filled with a strong cementitious material 52 like the material 42, and the ring 46 is thus permanently affixed to the lower end of the body 22 when the material 52 cures.

The lower terminal assembly 34 includes a detachable, annular end wall 54 having a central aperture 54a for receiving the terminal end portion of the cable 12. The end wall 54 seats against the lower end of the terminal ring 46 and is held in place by cap screws 56.

In accordance with the present invention, the lower end of the housing bore 24 is tightly sealed by an annular sealing ring 58 formed of conductive, elastomeric material. The elastomeric sealing ring is relatively short in height and formed with an axial bore therethrough having a diameter approximately equal to or slightly less than the outer diameter of the cable insulation 18. The bore of the seal ring is adapted to make airtight, sealing and electrical contact with the outer conductive shield 20 of the cable when it is inserted into the housing.

In addition to the elastomeric seal ring 58, the apparatus 10 includes a hollow sleeve 60 (FIG. 2) defining a stress relief assembly. The sleeve 60 is formed of rigid material and is capable of transmitting compressive stress against the seal ring. The sleeve 60 includes a lower, stress relief cone segment 62 of suitable conducting material here shown as a rigid castable epoxy, and an upper insulating segment 64 of dielectric material. The upper end surface of the stress relief cone 62 and the lower end surface of the insulating segment 64 are of matching frustoconical shape and are joined together in direct contact providing an interface area "A" which tapers upwardly and outwardly from around the insulation 18 of the cable in a symmetrical manner. When the cable 12 is prepared for termination and before the prepared terminal end portion of the cable is inserted into the terminal apparatus 10, the shield 20 is stripped back from the cable end a predetermined distance and is chamfered as shown so that the exposed shield 20 will slide easily into the bore of the seal ring 58 to make electrical contact with the seal ring. After insertion of the cable, in this manner, electrical contact is established between the stress cone segment 62 and ground through the conductive seal ring 58.

A number of important advantages are provided by the unique arrangement of the elastomeric seal ring 58 and the rigid sleeve 60. The sleeve 60, being formed of rigid material, is capable of exerting compressive force against the elastomeric seal ring 58 which can be short in length. High dielectric strength epoxy resin may be used and integrally molded in place onto the upper end of the stress relief cone 62.

Moreover the outwardly tapering conductive stress relief cone 62 provides an advantageous electrical stress distribution, with the electrical stress lines through the wall of the housing body 22 being spread to avoid high electrical stress concentrations therein and to provide an acceptable electrical stress level along the length of the cable insulation. In a particular embodiment, a castable semi-conductive epoxy used for the stress cone 62 achieves a significant cost reduction, and has a coefficient of thermal expansion closely matching that of the cable insulation. Thus expansion or extrusion of the conductive seal ring 58 between the stress cone 62 and the housing body 22 or the cable insulation 18 due to thermal creep is minimized.

Referring more particularly to FIG. 2, the lower end of the stress cone 62 has an outer diameter slightly less than the bore 24 of the housing 22, and an inner or minimum bore diameter of substantially the same dimensions as the diameter of the cable insulation 18. The lower end face of the stress relief cone is nearly equal in area to the upper surface of the elastomeric, conductive seal ring 58 and, accordingly, substantially uniform loading per unit area is achieved with excellent sealing being readily obtainable when the sleeve 60 exerts compression on the seal ring. The minimum diameter bore section in the lower end of the stress relief cone 62 is of relatively short height, and the frustoconical surface area "A" extends upwardly therefrom. The bore of the insulating segment 64 of the sleeve 60 is slightly larger than the diameter of the cable insulation 18 and voids therebetween are filled with insulating, high dielectric silicone fluid. Similarly, the outer diameter of the sleeve 60 is less than the diameter of the housing bore 24 except for a short segment at the lower end which is substantially equal in diameter or only slightly less than that of the bore 24. Silicone fluid is used to fill the void between the outer surface of the sleeve 60 and the bore 24 of the housing.

The stress relief cone 62 can be made of semiconductive castable epoxy resin which is formed by introducing powdered conductive material into the epoxy resin. A higher conductive material for the stress cone would compact the electrical stress lines while a lower conductive material for the stress cone would spread the stress lines. A semi-conductive material formed in the described manner has been found to be advantageous. The insulating segment 64 may be formed of epoxy resin and in the illustrated embodiment is bonded to the stress relief cone 62.

In addition to stripping back the outer coaxial shield 20 from the end of the cable, a portion of the insulation 18, which is generally formed of plastic material such as molded polyethylene, is stripped back a predetermined shorter length, leaving exposed a short length of the central conductor 14 at the upper end. A compression fitting 72 having a socket or recess in its lower end is slipped onto the exposed portion of the central conductor 14 and is then crimped or compressed with a tool to secure the fitting permanently in place on the conductor. The upper end portion of the terminal pin 72 is provided with threads as shown, and extends upwardly through a central opening in the top wall 76 of a removable, upper, cuplike terminal cap member 74 which is secured to the terminal ring 36 by a plurality of cap screws 78. The cap member 74 includes a generally cylindrical skirt or sidewall 80 having a lower end surface adapted to seat in an annular recess 36a formed around the outer periphery of the upper terminal ring 36. An O-ring 82 is provided to form an airtight seal between the cap member and the terminal ring 36, and an O-ring 84 is mounted on the terminal fitting 72 to seal between the body of the fitting and the confronting surface of the circular aperture in the top wall 76. A nut 86 is used on the upper threaded portion of the terminal fitting 72 to aid in supporting the cable in a fully inserted position in the apparatus.

In order to provide an air-free, high dielectric insulating system around the cable insulation 18 above the sleeve 60, the upper portion of the interior bore 24 of the housing 22 around the cable insulation is filled with an insulating fluid, such as silicone fluid, and with one or more tubular, load-bearing, insulating sections or rings 90. Alternately, the load-bearing insulation may include a plurality of load-bearing insulating rods, slats, or sections. The insulator rings 90 are adapted to transmit compressive forces toward the upper end face of the insulating segment 64 of the sleeve 60 in order to maintain the conductive seal ring 58 in a tightly sealed condition around the cable at the entrance end of the housing. The rings 90 are constructed of insulating material capable of transmitting axial compressive force against the radial upper end face of the sleeve and the lower end portion of each ring is conically tapered toward a point as shown in the drawings in order to prevent entrapment of air bubbles between abutting ends of the rings. At least one of the conical lower end surfaces is provided with one or more radial slots 90a in order for the dielectric fluid to flow between the interior and exterior surfaces of the rings and to aid in eliminating entrapped air by permitting it to move more easily toward the upper end of the housing. This construction also permits the pooling of a supply of fluid at the junctions between adjacent insulator rings 90, which fluid can then more easily flow to fill the voids as the air escapes. Because of the relatively loose fit of the insulating rings 90 within the bore 24, the dielectric fluid flows easily downwardly into the lower end portion of the housing and displaces any air.

Because the elastomeric sealing ring 58 and sleeve 60 are relatively short in length in comparison to the total length of dielectric material desired for a given high voltage application, the volume of space above the sleeve within the housing bore around the cable insulation 18 can become relatively large, especially in the higher voltage ranges. If this space is filled entirely with dielectric fluid, because of the relatively high temperature coefficient of expansion of presently available fluids, the depth or level of fluid above the sleeve may change over too large a range when extremes in temperatures are encountered. For example, in below zero weather, the volume occupied by a given mass of fluid is reduced significantly and the fluid depth above the sleeve 60 may be reduced below an acceptable level. The use of load-bearing insulating rings 90 has eliminated this problem and, in addition, provides a convenient means for transmitting compressive forces through the sleeve 60 to maintain the seal ring 58 in sealing engagement at the lower end of the housing throughout a wide variation in temperature.

Any suitable means may be used for compressing the sealing ring 58, and in the illustrated embodiment an annular thrust ring 94 is mounted inside the cap 74 and is supported on a plurality of radially spaced apart compression springs 96 extending longitudinally parallel and outwardly of the cable. The lower ends of the compression springs 96 bear against the upper end face of the upper insulating ring 90 and the upper end of the springs are in contact with the lower surface of the thrust ring. Each spring is guided against lateral deflection by a coaxially centered guide rod 98 having a lower end portion threaded into or integrally molded in the upper insulator ring 90. In addition to preventing lateral displacement of the springs 96, each guide rod is formed with an annular groove 98a spaced downwardly from the upper end a predetermined distance to indicate visually to an observer when the desired amount of spring compression is obtained to ensure adequate sealing compression of the seal ring 58. As shown in FIG. 1, when grooves 98a of the rods 98 are visible just above the upper surface of the thrust ring 94, the amount of compression on the springs is proper.

The thrust ring 94 is movable downwardly relative to the housing 22 in order to compress the springs 96 by a plurality of threaded studs 100 and nuts 102. The lower end of each stud is threaded into or otherwise connected to the terminal ring 36, and as the nuts 102 are tightened on the stud, the thrust ring 94 is forced downwardly to exert compression against the seal ring 58 through the springs 96, the insulator rings 90, and rigid sleeve 60. FIG. 1 illustrates the springs 96 in a compressed condition after the cable termination has been completed.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A cable termination apparatus for insulated power cable having a coaxial outer conductive sheath comprising an elongated housing having a bore receiving a terminal end portion of said cable; annular sealing means of deformable material closing one end of said bore around said cable in an air-free seal; a hollow sleeve of rigid load-bearing material in said bore around said cable, said sleeve including a tubular semiconductive segment adjacent said sealing means forming a stress cone having a frustoconical surface tapering outwardly of the cable insulation and a tubular insulating segment of dielectric material bonded to said frustoconical surface; and force means exerting compression on said sealing means through said sleeve for maintaining said air-free seal.

2. The termination apparatus of claim 1 wherein said sealing means is constructed of conductive material and is in direct contact along an inside radial end face with said conductive segment of said sleeve.

3. The cable termination apparatus of claim 2 including means sealing said bore at the end opposite said annular sealing means and including insulating fluid in said bore between said sealed ends.

4. The cable termination apparatus of claim 1 wherein said sealing means is relatively short in dimension axially of said bore in relation to the axial dimension of said sleeve.

5. The cable termination apparatus of claim 4 wherein said sleeve extends only a fractional part of the axial length of said bore, and a remaining portion of said bore is filled with a load-bearing insulating system exerting force on one end of said sleeve.

6. The cable termination apparatus of claim 5 wherein said load-bearing insulating system comprises a plurality of rigid annular insulating rings around said cable insulation and insulating fluid in said bore around said cable.

7. The cable termination apparatus of claim 6 wherein said force means includes spring means exerting resilient end thrust on said sleeve through said insulating rings for maintaining said annular sealing means in an air-free seal.

8. A cable termination assembly including an insulated, hollow housing having an elongated bore receiving a terminal end portion of an insulated power cable having a coaxial conductive ground sheath; a pair of conductive terminals at opposite ends of said housing connected to said power cable and said sheath, respectively; annular, deformable, conductive sealing means at one end of said housing sealing said bore around said cable and making electrical contact between said sheath and one of said terminals; a hollow sleeve of load-bearing material around said cable in said bore including a conductive segment in contact with said sealing means forming a stress cone with a frustoconical surface tapering outwardly of said cable insulation and an insulating segment in contact with said surface, and bias means exerting force on said sealing means through said sleeve for maintaining said seal at said one end of said bore.

9. The cable termination assembly of claim 8 wherein said bias means includes a plurality of rigid insulating rings around said cable in said bore, one of said rings being in end contact with an end of said insulating segment of said sleeve.

10. The cable termination assembly of claim 8 wherein said sealing means is substantially shorter in axial length than said sleeve and said sleeve is substantially shorter in axial length than said bore.

11. A device for terminating a high voltage cable comprising
an elongated housing having a bore receiving an end portion of said high voltage cable,
sealing means positioned at one end of said bore maintaining said end portion of said cable and said housing in a sealing engagement, said sealing means including an annular deformable member,
filler means within said bore between said end portion of said cable and said elongated housing, said filler means including a first substantially noncompressible elongated unitary member, said first noncompressible member including a relatively conductive portion adjacent said deformable member, said conductive portion having a first surface exhibiting an increasing taper away from said end portion of said cable with increasing distance from said deformable member, said first noncompressible member further including a relatively nonconductive portion having a second surface complementarily shaped to at least a portion of said first surface, and
compressive means biasing said deformable member and said first noncompressible member into a compressive engagement to maintain said sealing engagement between said end portion of said cable and said housing.

12. A device as defined in claim 11 wherein said filler means comprises a dielectric system, said dielectric system including a liquid dielectric portion and a solid dielectric portion.

13. A device as defined in claim 12 wherein said relatively nonconductive portion of first noncompressible member forms a part of said solid dielectric portion.

14. A device as defined in claim 12 wherein said solid dielectric portion includes a plurality of substantially noncompressible elongated unitary dielectric members serially positioned within said bore between one end of said bore and said first noncompressible elongated member.

15. A device as defined in claim 12 wherein said liquid dielectric portion is positioned between said solid dielectric portion and said end portion of said cable and between said solid dielectric portion and the inner surface of said elongated housing.

16. A device as defined in claim 11 wherein said annular deformable member comprises an annular deformable electrically conductive member.

17. A device for terminating an insulated high voltage power cable comprising
an elongated housing of insulating material having a bore receiving an end portion of said insulated high voltage power cable,
annular deformable sealing means maintaining said housing and said end portion of said cable in a sealing engagement and,
conductive means for providing voltage stress relief for the insulation of said high voltage cable, said conductive means positioned within said bore in a compressive relationship with said sealing means.

18. A device as recited in claim 17 wherein said sealing means is formed of a conductive material.

19. A device for terminating an insulated high voltage power cable of the type having a central current carrying conductor and an outer conductive sheath connected to a source of ground potential comprising
an elongated housing of insulating material having a bore receiving an end portion of said insulated high voltage power cable,
an electrically conductive annular deformable sealing means maintaining said housing and said end portion of said cable in a sealing engagement and
conductive means for providing voltage stress relief for the insulation of said high voltage cable, said conductive means positioned within said bore and electrically connected to said conductive sheath by said sealing means.

20. A device as defined in claim 19 wherein said conductive means is formed of a substantially rigid material.

21. A device as defined in claim 20 further comprising compressive means maintaining said conductive means and said sealing means in a compressive engagement.

22. A device for terminating an insulated high voltage power cable comprising an elongated housing of insulating material having a bore receiving an end portion of said insulated high voltage power cable, a deformable sealing means positioned at one end of said bore maintaining said end portion of said cable and said housing in a sealing engagement, a substantially noncompressible elongated unitary member in said bore around said end portion of said cable, said noncompressible member having an inner diameter at least along a portion of the inner surface of said noncompressible member greater than the outer diameter of said end portion of said cable to produce a first substantial clearance between said portion of said inner surface of said noncompressible member and said end portion of said cable and having an outer diameter less than the inner diameter of said housing to produce a second substantial clearance between said noncompressible member and said housing, said noncompressible member including a conductive voltage stress relief means for the insulation of said high voltage cable, said conductive stress relief means including a surface exhibiting an increasing taper away from said end portion of said cable with increasing distance from said sealing means, said noncompressible member further including an insulating portion having a surface mating with at least a portion of said surface of said conductive stress relief means and dielectric means within said housing between said end portion of said cable and said housing, at least a portion of said dielectric means comprising a liquid dielectric, said first and said second clearances being filled by said liquid dielectric.

* * * * *